United States Patent
Kelley

[15] 3,689,616
[45] Sept. 5, 1972

[54] COLD WAX PROCESS FOR FORMING CANDLES

[72] Inventor: Bernard B. Kelley, Sherwood, Oreg.

[73] Assignees: Joseph Vergeer, 4, Portland, Oreg.; Paramatic Corporation, part interest to each

[22] Filed: April 2, 1970

[21] Appl. No.: 25,161

[52] U.S. Cl. .................................. 264/68, 264/115
[51] Int. Cl. .............................................. B29c 3/00
[58] Field of Search ......................... 264/140, 68, 115

[56] References Cited

UNITED STATES PATENTS

| | | | |
|---|---|---|---|
| 1,371,671 | 3/1921 | Duryea et al. | 264/120 |
| 2,399,592 | 4/1946 | Bradshaw | 264/68 |
| 2,582,327 | 1/1952 | Haine | 264/140 |
| 3,414,640 | 12/1968 | Garetto et al. | 264/140 |
| 2,697,249 | 12/1954 | Bettes, Jr. et al. | 264/115 |
| 3,531,559 | 9/1970 | Barfred | 264/144 |

Primary Examiner—Robert F. White
Assistant Examiner—J. R. Hall
Attorney—Eugene M. Eckelman

[57] ABSTRACT

A process for molding wax candles at room temperature. The wax is first reduced to particles and then compressed into a product at a pressure and mold closing time capable of developing a sufficient internal heat from the heat of compression and the heat of friction to fuse the wax into a solid, substantially uniform density product. Necessary to the invention the particles employed in the process must be reduced to a size or shape capable of producing the necessary heat of compression and heat of friction for fusing the wax substantially uniformly throughout the product. The apparatus employed includes pressure operated plungers which are arranged to move mold members at a speed and at a force such that the heat of compression and heat of friction developed in the crystalline structure of the wax reach a temperature capable of fusing the wax without the application of outside heat. The apparatus also includes wick feeding mechanism capable of holding wicks under tension in a cavity when the candles are being molded.

9 Claims, 7 Drawing Figures

PATENTED SEP 5 1972 3,689,616

BERNARD B. KELLEY
INVENTOR.

BY Eugene M. Eckelman
ATTY.

COLD WAX PROCESS FOR FORMING CANDLES

BACKGROUND OF THE INVENTION

This invention relates to a novel process for molding products from wax and more particularly is concerned with a cold wax formulation of products. The invention is illustrated herein as being associated with the making of candles, but it is to be understood that any type of wax product capable of being molded can be made by the present process.

Candles have heretofore been made in various ways. For example, circular candles are usually formed by multiple dippings in a vat of molten wax. As another example, molten wax is poured into molds, and when the wax has solidified the mold is opened. Such prior processes have distinct disadvantages, a common one of which is that fast production cannot be attained without a vast array of machinery. That is, in the process of forming the candles by dipping, the multiple dipping requires considerable time, and in the process where the candles are molded by pouring molten wax into a form, cooling time for the wax in the mold slows the process considerably. This latter process also has the disadvantage that the wax shrinks as it solidifies and a pocket forms in the top surface of the candle to detract from the appearance, or, in most instances, the mold is filled with the bottom side up and subsequent pours to the initial one are made until all shrinkage is finally compensated for.

SUMMARY OF THE INVENTION

According to the present invention and forming a primary objective thereof, a process is provided for the cold molding of wax into products having a substantially uniform density.

More particularly, an object of the present invention is to provide a process of cold molding of wax products including the step of reducing solid wax to a particle size which is capable of producing a heat of compression and heat of friction sufficient to fuse the particles together when subjected to selected mold pressures and mold closing times.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figure 5:
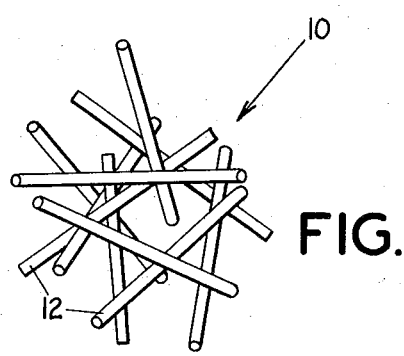
FIG. 5 is a detail view, greatly enlarged, of a wax crystal.

According to the invention, wax is capable of being molded into a product having substantially uniform density throughout without first being reduced to a molten state. Briefly stated, the invention comprises first reducing solidified wax to particles which are of a size or shape which makes them capable of being fused together into a product by internal heat created by heat of compression and heat of friction. The type of wax used may be any type which can be fused in the manner just stated and of course any type which is capable of serving as a selected product such as a candle. As is well known, a paraffin type wax is mostly used for candle construction, and with reference to FIG. 5, a crystal 10 of such wax comprises a plurality of stick-like fragments 12 disposed in haphazard arrangement. It has been found that in the compressing of wax crystals, the fragments 12 being re-arranged and compressed together develop heat, and upon being pressure molded at selected pressures and at selected closing speeds, sufficient heat is developed to fuse the crystals into a solid mass of substantially uniform density.

According to the invention, in order for the molding step to develop the necessary heat of compression and heat of friction to fuse the wax into a product having a substantially uniform density throughout, the wax first must be reduced to a selected particle size or shape. That is, it is necessary as one example that the wax be reduced to thin flakes or shavings 14. The surface size of the flake is not particularly important, the important feature being that it have one dimension that is small so that the crystals are subjected to maximum rearrangement and frictional engagement when compressed.

Figure 1:
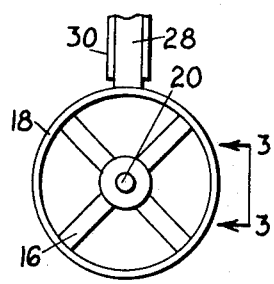
FIG. 1 is an end elevational view, somewhat diagrammatic, of apparatus for forming particles capable of being used in the present process.
Figure 2:
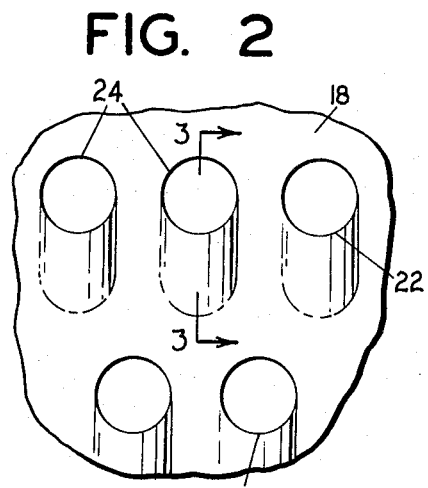
FIG. 2 is an enlarged fragmentary elevational view of particle cutting means of the apparatus of FIG. 1, such view being taken on the line 2—2 of FIG. 1.
Figure 3:
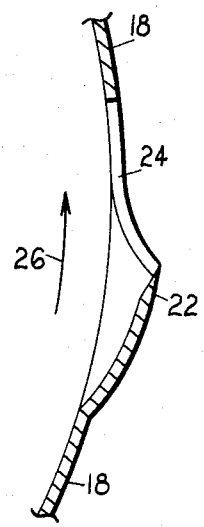
FIG. 3 is an enlarged fragmentary sectional view taken on the line 3—3 of FIG. 2.

FIGS. 1, 2 and 3 show apparatus for producing the flakes 14. Such apparatus comprises a drum-like structure 16 having a peripheral surface 18. The drum 16 is mounted on a shaft 20 adapted to be driven by power means, not shown. Drum surface 18 has a plurality of cutting teeth 22 formed therein, such teeth, as best shown in FIGS. 2 and 3, being impressed outwardly as a part of and from the surface 18 of the drum. An opening 24 is provided forwardly of the teeth with relation to the direction of rotation of the drum, such direction being designated by the arrow 26 in FIG. 3. Upon rotation of the drum, a bar of wax 28 is moved through a guide 30 for contact with the surface of the drum 16. The drum cuts off particles of wax in substantially the shape of the shavings shown in FIG. 4, and the openings 24 allow the wax shavings to be directed interiorly of the drum. The drum may be tilted axially to discharge the shavings 14.

Figure 4:
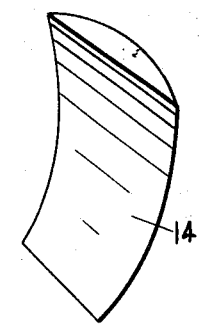
FIG. 4 is a perspective view of a particle capable of use in the present process and, such particle being produced by the cutting apparatus of FIGS. 1–3.

The shape of shavings 14 shown in FIG. 4, comprises only an exemplary shape of particles which may be employed in the process of the present invention, and similarly the wax cutting apparatus of FIGS. 1, 2 and 3 is only exemplary of apparatus which may be employed for producing particles. Thus it is to be understood that the present invention, wherein wax particles can be fused into a solidified product by the heat of compression and the heat of friction resulting from a compressing step, may be carried out with other types of particles, such as flakes, wafers, whole or factured pellets, and the like.

Figure 6:
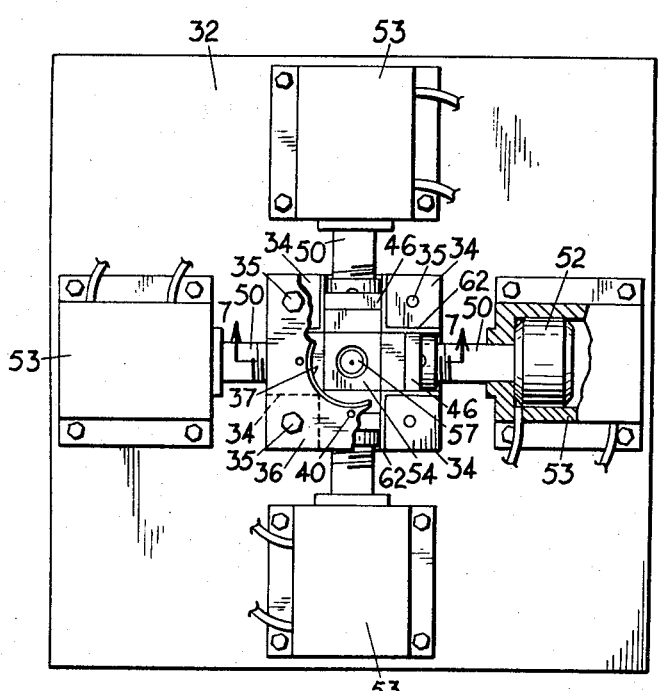
FIG. 6 is a top plan view of a molding machine for carrying out the process of the present invention.
Figure 7:
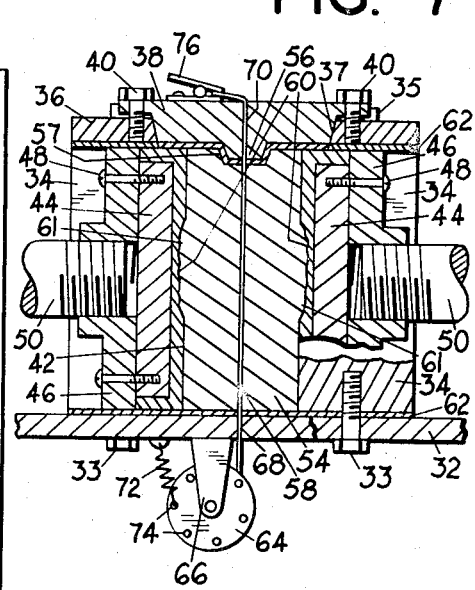
FIG. 7 is an enlarged fragmentary sectional view taken on the line 7—7 of FIG. 6.

Mold apparatus for carrying out the method invention is illustrated in FIGS. 6 and 7. As seen in the plan view of FIG. 6, the mold comprises a base plate 32 having four upright posts 34 secured integrally thereto, as by cap screws 33. Secured on top of the posts 34, as by cap screws 35, is a top plate 36 having a center aperture 37 adapted to be closed by a cover plate 38 removably secured to the plate 36, as by cap screws 40. Bottom plate 32, insert 38 and the posts 34 form a mold cavity 42 in combination with mold inserts 44 secured on laterally movable plunger heads 46, as by screws 48. Plunger heads 46 are secured to piston rods 50 extending from piston heads 52 operating in cylinders 53, such as hydraulic cylinders, in a well known manner. It is thus apparent that the plunger heads 46 and their respective inserts 44 can be moved inwardly to compress wax, which was inserted when the cavity was open into a product 54 such as a candle.

The cover plate 38 of the mold is provided with a circular depending central projection 56 for providing a recess 57 in the candle into which a short length of a wick 58 projects. Also, the inserts 42 on the plunger heads 46 may have suitable contours 60 for forming designs 61 on the sides of the candles in the molding process. The face surfaces of the inserts 42 may either be recessed as shown in FIG. 7 to form projections as the designs on the candles or if the design is to comprise a recess in the candle the contours 60 may comprise projections on said face surfaces.

For the purpose of preventing wax from adhering to defining parts of the cavity, such cavity parts are provided with lubricant coatings or coverings which will not adhere to wax. For example, base 32 and the cover plate 38 have an inner coating of low friction coefficient teflon and the inserts 42 may be coated or constructed of similar material or heat treated polyurethane.

It is desired that wick feeding mechanism be employed in combination with the molding apparatus. For this purpose, a drum 64 having a wick supply thereon is rotatably supported on brackets 66 depending from the base plate 32 in integral relation. Base plate 32 has an aperture 68 through which the wick 58 passes and cover plate 38 similarly has an aperture 70 for receiving the wick. A tension spring 72 is connected between the drum 64 and the bottom plate 32 and is adapted for removable connection with a plurality of holes 74 in the drum. Cover plate 38 has a gripping device 76 for holding the free end of the wick. In the operation of the device, the wick 58 is pulled upwardly manually and the free end attached to the gripping device 76. Such is accomplished when the mold is open and against the action of spring 72 so that the wick is held in tensioned relation as the mold is closed, thus providing a straight wick in the candle disposed on the axis of the candle. Spring 72 is detachably engaged with a selective hole 74 in the drum 64 to accomplish the desired tensioning action on the wick.

To form a candle, the mold is opened by withdrawing the heads 46 and opening the cover plate 38. The wick is drawn upwardly into place and passed through the cover plate 38 for attachment to the gripping device 76. The mold is charged with wax particles, and upon operation of the plunger, the candle is formed. The candle 54 is removed after opening the mold and the wick cut off as desired.

According to the present process, candles are adapted to be formed at a fast rate. That is, the candle is substantially completed when the mold is fully closed as opposed to molten processes which must wait for the wax to solidify. The mold is closed at a force and at a speed capable of developing sufficient heat from compression and friction to produce an internal temperature in the wax to fuse the wax. The force used for closing the mold as well as the closing speed will vary, depending upon the grade or type of wax used. Where paraffin wax is used, as an example, approximately 2,500 p.s.i. is a preferred mold pressure at a closing speed of approximately 3 inches in 4½ seconds. Certain grades of paraffin waxes or even other classes of waxes may require a greater or lesser mold force and a faster or slower closing speed. Most types of waxes, however, for forming candles can be fused in a pressure range of from 1,700 to 2,800 p.s.i. and at closing speeds in the range of from 3 inches in 3½ seconds to 3 inches in 4½ seconds.

The force used and the closing speed may also depend upon the size and type of particle 14. For example, if the particles 14 are rather small or thinly cut, less force is required to develop the necessary heat to fuse the wax than if larger particles are used, it being apparent that such a greater force is required for the larger particles since the crystals in larger particles are more difficult to rearrange and compress. A much more uniform density product is formed by the use of small particles. A preferred particle size is one/sixteenth to three/sixteenths inch in one dimension, such as the thickness, whether flake construction or pellet construction, or otherwise.

The present process requires a dwell time of approximately seven seconds, making it apparent that products can be formed very rapidly as compared to molds of the type which must wait for molten wax to solidify.

It has been found that according to the present process the density of the candle, while being substantially uniform throughout, is very slightly greater in the area adjacent to the surfaces thereof than at the middle, and such is important in that when the candle is lit it will burn down the middle and leave an outer shell, thus preventing wax from flowing over the sides. The general surface texture of the candle depends upon the size of particles used in that the smaller the particle the finer the texture and the larger the particles the coarser the texture. Although the drawings illustrate the product as being square in cross section, it is to be understood that it may be round or of other contour.

It is to be understood that the form of my invention herein shown and described is to be taken as a preferred example of the same and that various changes in the shape, size or arrangement may be resorted to without departing from the spirit of my invention or the scope of the subjoined claims.

Having thus described my invention, I claim:

1. The process of forming a candle from crystalline wax comprising:
   a. reducing a solid mass of said wax into selected particles of a size having one dimension so small that the crystals of the wax are subjected to maximum rearrangement and frictional engagement when the wax particles are compressed;
   b. placing a charge of the wax particles into a mold containing a candle wick, c. compressing the wax particles in the mold around the wick with pressing means moving at a speed and at a pressure sufficient that the heat of friction and the heat of compression between the wax particles reaches a temperature to fuse the particles into a unitary mass, without outside heat, within a dwell time of approximately 7 seconds, d. cooling the unitary mass to a solidified state, and e. removing from the mold, the resulting formed candle.

2. The process of claim 1 wherein said reduction of the wax into particles comprises cutting flake-like pieces from a body of solid wax.

3. The process of claim 1 wherein the speed of the compressing member is in the range of from 3 inches per 3½ seconds to 3 inches per 4½ seconds.

4. The process of claim 1 wherein the speed of the compressing member is approximately 3 inches per 4½ seconds.

5. The process of claim 1 wherein the compressing pressure is in the range of from 1,700 psi to 2,800 psi.

6. The process of claim 1 wherein the compressing pressure is approximately 2,500 psi.

7. The process of claim 1 wherein the compressing pressure is approximately 2,500 psi and the speed of the pressing member is approximately 3 inches per 4½ seconds.

8. The process of claim 1 wherein the compressing step is accomplished from at least two sides of the charge of wax.

9. The process of claim 1 wherein the compressing step is accomplished from four sides of the charge of wax.

* * * * *